United States Patent [19]

Tucker et al.

[11] 3,745,267

[45] July 10, 1973

[54] ORNAMENTAL TELEPHONE CONSTRUCTION

[75] Inventors: Council A. Tucker, Glendale; George Perkins, Laguna Beach; James H. Langworthy, La Habra Heights, all of Calif.

[73] Assignee: American Telecommunications Corporation, El Monte, Calif.

[22] Filed: Nov. 22, 1971

[21] Appl. No.: 200,798

[52] U.S. Cl. .................................................. 179/179

[51] Int. Cl. ............................................. H04m 1/02

[58] Field of Search.................... 179/179, 178, 184, 179/100 D, 100 R

[56] References Cited

UNITED STATES PATENTS

| | | | |
|---|---|---|---|
| 884,500 | 4/1908 | Knudsen | 179/147 |
| 2,473,775 | 6/1949 | Allen et al. | 179/179 |
| 684,963 | 10/1901 | Washburn | 179/179 X |
| 988,706 | 4/1911 | Halldow | 179/179 |
| 1,561,345 | 11/1925 | Miller | 179/178 |
| 605,913 | 6/1898 | Ray | 179/179 |
| 787,583 | 4/1905 | Mason | 179/179 |

*Primary Examiner*—Thomas W. Brown
*Attorney*—Robert L. Parker et al.

[57] ABSTRACT

An upright telephone construction has a base housing, an upright column on the base housing, a transmitter assembly pivotally secured on the column, and a receiver assembly coupled to the base. Each of these members has a thin ornamental covering over it. Two of three marginal edges of the base covering are protected by abutting ridges or flanges of the base housing. In the case of the third marginal edge of the base covering, column, transmitter and receiver, the marginal edges of the coverings are protected by overlying flanges.

3 Claims, 10 Drawing Figures

GEORGE PERKINS,
JAMES H. LANGWORTHY,
COUNCIL A. TUCKER,
INVENTORS

BY
Beehler, Arant & Jagger
ATTORNEYS

GEORGE PERKINS
JAMES H. LANGWORTHY
COUNCIL A. TUCKER
INVENTORS

BY Beehler, Arant & Jagger
ATTORNEYS

GEORGE PERKINS,
JAMES H. LANGWORTHY,
COUNCIL A. TUCKER,
INVENTORS

BY
Beehler, Arant & Jagger
ATTORNEYS

ORNAMENTAL TELEPHONE CONSTRUCTION

BACKGROUND OF THE INVENTION

It is desirable to be able to manufacture a single basic telephone structure which may, with a minimum of effort and expense, be provided with any selected one of a relatively large number of different ornamental appearance characteristics. It is then possible for many different telephone users to have the satisfaction of knowing that each possesses a telephone instrument whose ornamental appearance is unique and distinctive. In crowded cities the apartment dweller may tend to become depressed with the knowledge that his living environment is exactly the same as that of many other persons, but the acquisition of an ornamental telephone having a distinctive and unique appearance lends a distinctive appearance to the apartment and at the same time tends to make the life of the apartment dweller unique and distinctive and hence more pleasant. In luxurious homes, also, the traditional standard telephone set with its standard drab appearance is found to detract from the surroundings, and it is a valuable improvement indeed if an ornamental and distinctive telephone can be substituted with only a nominal added expense.

Some efforts have been made heretofore to provide ornamental and distinctive telephones, with an expense which would be comparable to that of standard telephone units. The present invention represents an extension of that effort and the utilization of what is believed to be a highly novel and original technique, combining economy of manufacture with extreme versatility of appearance.

SUMMARY OF THE INVENTION

According to the present invention a composite housing structure for a telephone instrument is formed by connecting a number of separate housing members in a series relationship, so that the separate passageways formed in each of the housing members are in communication with each other and thereby form a continuous passageway which is adapted to receive an electrical circuit that is part of the telephone instrument. At least one of the housing members is covered by an ornamental cover member, which is utilized not for its structural strength or as a necessary structural component but rather as a means for providing a selected ornamental appearance which differs from the appearance of the underlying housing member which it covers. The ornamental cover member extends about and covers substantially the entire surface area of its associated housing member, and each end of the ornamental cover member is protected by a rigid circumferential flange, or the like, that is a part of and supported from the housing structure.

Since the ornamental cover members may be provided in various different colors or decorative appearances, the telephone housing of the present invention is therefore a modular system of apparatus in which certain components (the housing members) are generally the same in all manufactured units while other components (the ornamental cover members) are selected from a large group of component parts which are equivalent to each other in the mechanical sense but distinctive in the ornamental sense.

The object and purpose of the present invention, therefore, is to provide a telephone housing structure which is capable of affording a large number of distinctively different ornamental appearances at a cost level which is comparable to the cost involved in making all of the units with the same identical appearance.

DRAWING SUMMARY

PREFERRED EMBODIMENT

Figures 1, 2, 3:
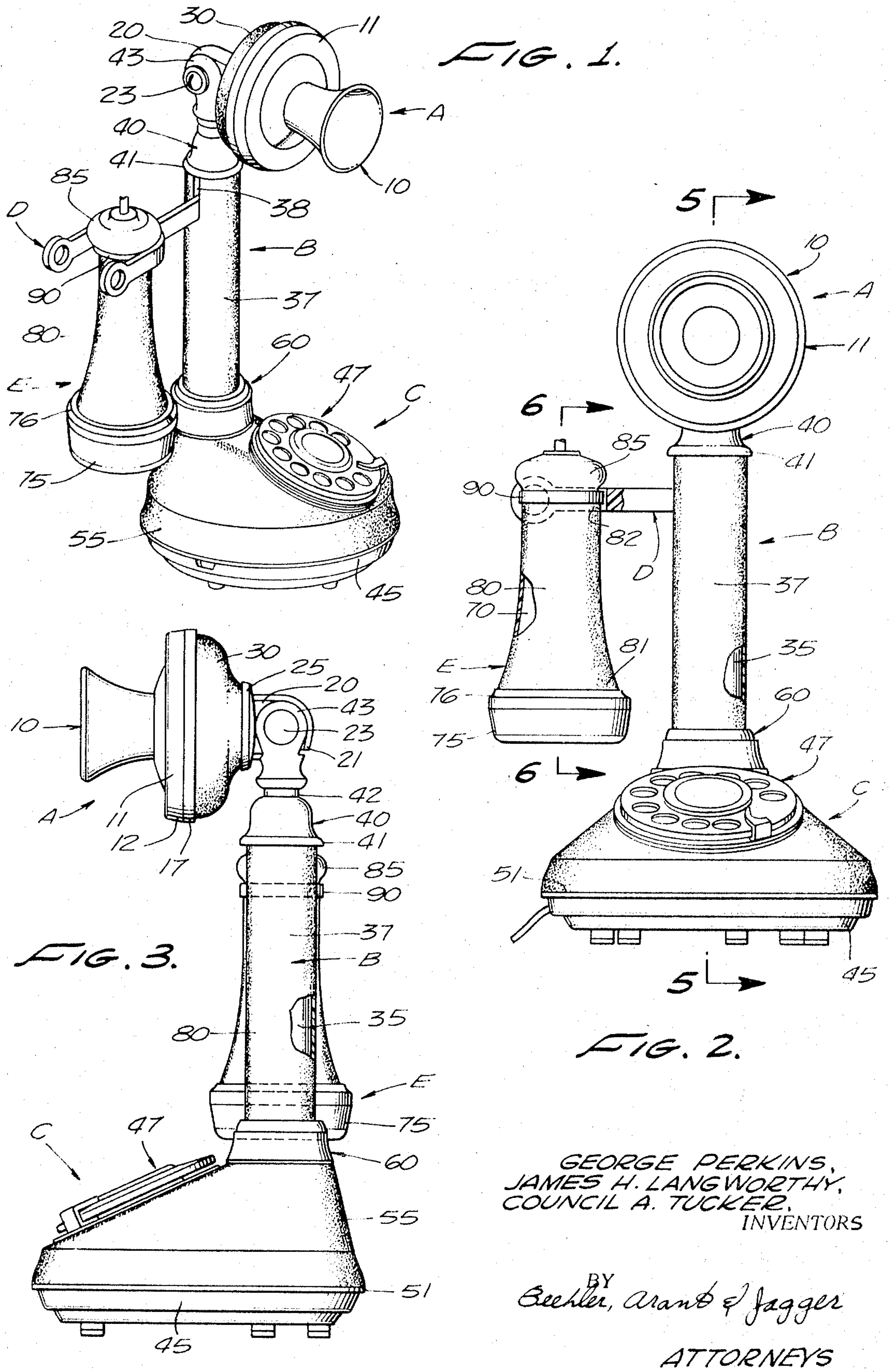
FIG. 1 is a front perspective view of a telephone instrument in accordance with our invention.
FIG. 2 is a front elevation view of the telephone instrument of FIG. 1.
FIG. 3 is a side elevation view of the instrument taken from the right hand side.

Referring now to the drawings, the complete instrument includes a transmitter assembly A, a column assembly B, a base assembly C, a hook D, and a receiver assembly E.

The transmitter assembly A includes a mouthpiece 10 having base plate 11 with oppositely extending circumferential flange 12 having threaded interior wall 13. Transmitter housing 15 has a somewhat bowl-shaped configuration, with its upper wall being externally threaded at 16 for engagement by the threads 13 of the mouthpiece assembly, followed by a circumferential ridge 17 having a flange 18 which leaves an annular groove 19 (see FIG. 7). From the bottom of the bowl-shaped configuration of transmitter housing 15 there extends an upper swivel shank 20 having a rounded end 21 in which a pivot joint is formed for pivotally supporting the transmitter assembly A.

A transmitter ferrule 25 (FIG. 10) has a somewhat dish-shaped or cap-shaped configuration, with a slot 26 in the bottom of the dish or cap through which the shank 20 of the transmitter housing passes.

Figures 4, 5, 6:
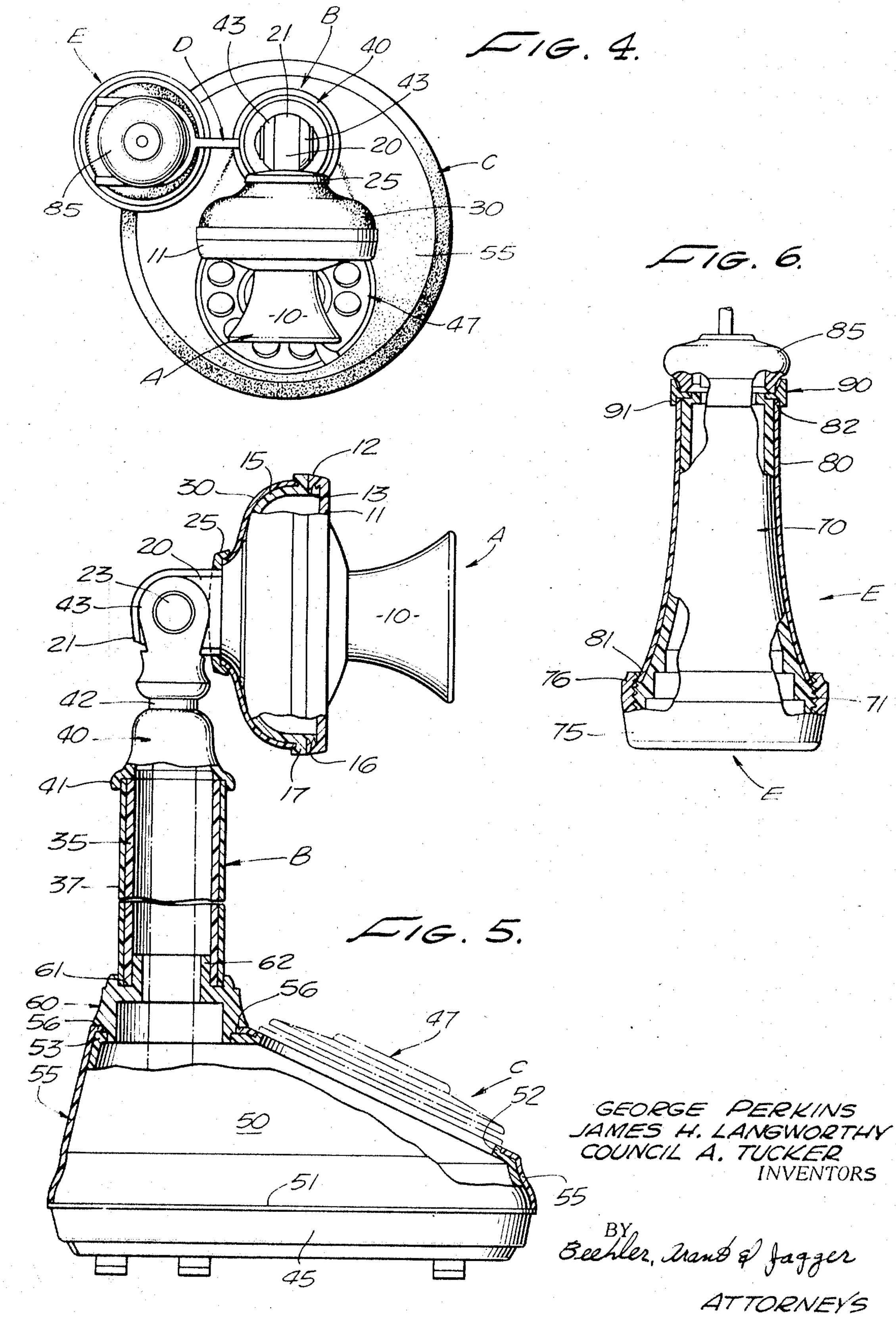
FIG. 4 is a top plan view of the instrument.
FIG. 5 is a cross-sectional elevational view taken on the line 5—5 of FIG. 2.
FIG. 6 is a cross-sectional elevational view taken on the line 6—6 of FIG. 2.
Figure 7:
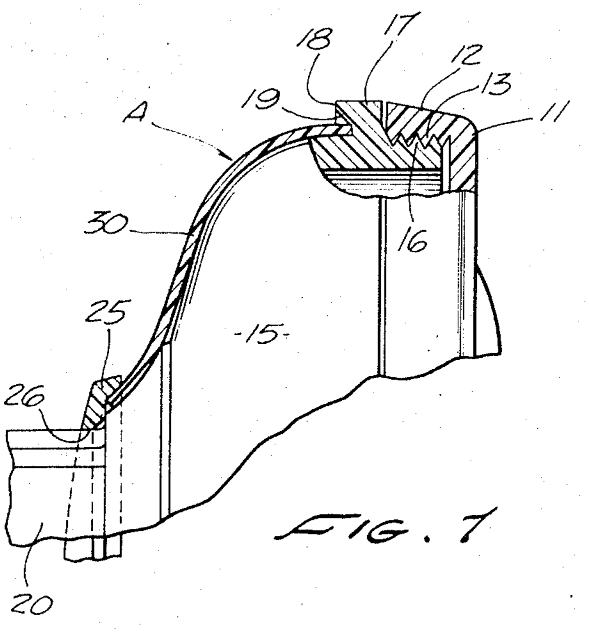
FIG. 7 is a fragmentary cross-sectional view of the transmitter, showing in enlarged form the upper portion of FIG. 5.

An ornamental cover member 30 has a somewhat conical configuration but with convolutions or curves along its length which conform to the external surface of the transmitter housing 15. As best seen in FIGS. 5 and 7, the ornamental cover member is of diminishing diameter throughout its length, extends about the outer surface of transmitter housing 15 in relatively tight-fitting relationship therewith, and has its large-diameter circular end received in the annular groove 19 while its small-diameter end is captured by the circumferential flange of the ferrule 25.

Transmitter housing 15 is preferably integrally formed from relatively rigid plastic material, and has a comparatively thick wall structure. The ornamental cover member 30 is preferably integrally formed from plastic material, which material may be considerably more flexible than the material of the housing 15, and the wall of the cover member 30 is relatively thin. For example, the thickness of cover member 30 may typically be 0.030 inches.

The column assembly B includes a cylindrical column 35 and a column top cap 40. Column 35 is covered by a cylindrical cover member 37 which is precisely the same length as the column 35. The lower portion of top cap 40 is generally bell-shaped, the lower extremity having a circumferential flange 41 which extends outwardly and is curved downwardly, forming an interior annular shoulder which is engaged by the end faces of both the column 35 and ornamental cover member 37. At its longitudinal center the top cap 40 has its external diameter reduced at 42, solely for purpose or ornamentation. The upper end of top cap 40 has a pair of ears 43 between which the shank 21 of the transmitter assembly is received, there being a pivot pin 23 which holds the two parts of the pivot joint together. A continuous passageway, not specifically shown, extends from the interior of transmitter housing 15 through its shank 20 and the entire length of top cap 40 down into the column 35, for receiving an electric circuit that is an essential part of the telephone instrument.

Base assembly C (FIG. 5) includes a base 45, a base housing 50, a base cover member 55, and a base adapter 60. The base 45 is essentially flat and receives and supports on its upper surface an electromechanical assembly of the operating parts of the telephone instrument. Base 50 is a pedestal-shaped hollow housing having a ridge 51 at its lower extremity which extends around the entire circumference of the housing and projects horizontally outward therefrom. Base housing 50 also has a sloping upper portion with an opening in which a dial mechanism 47 is received, that opening being surrounded by a circular ridge 52 which is formed on the housing. The apex or upper part of the housing forms a flat circular opening which is horizontally disposed, being bounded by the wall portion 53.

Ornamental cover member 55 has an interior configuration such as to fit tightly over the exterior surface of the base housing 50. At its lower end the ornamental cover member 55 abuts firmly against the upper flat surface of the housing ridge 51. Cover member 55 also abuts against the outer wall surface of the ridge 52, throughout its circumference. At its upper end the cover member 55 is turned radially inwardly at 56, so as to over-lie a portion of the housing wall 53. The cylindrical column 35 is preferably integrally formed from relatively rigid plastic material, having a relatively thick wall, and the base housing 50 is preferably formed in a similar manner. The ornamental cover member 37 preferably has a thin wall structure, as does the ornamental cover member 55, a typical wall thickness for these cover members being about 0.030 inches.

The base adapter 60 has a generally ring-shaped configuration, and is preferably integrally formed from relatively rigid plastic material. On its upper end face it has an annular groove 61 which is of precisely the proper width to receive the lower ends of both the column 35 and its ornamental cover member 37. The material of the base adapter 60 which lies radially within the groove 61 is identified by reference numeral 62, and it projects upward a considerable distance further than does the wall of the adapter which lies outside the groove 61. The base adapter 60 is flared outwardly at its lower end to a larger radius. It is notched on the outer corner of its lower end to provide a first exterior annular shoulder which rests upon the wall 53 of base housing 50, and a second exterior annular shoulder which rests upon the in-turned portion 56 of ornamental cover member 55.

Figures 9, 10:
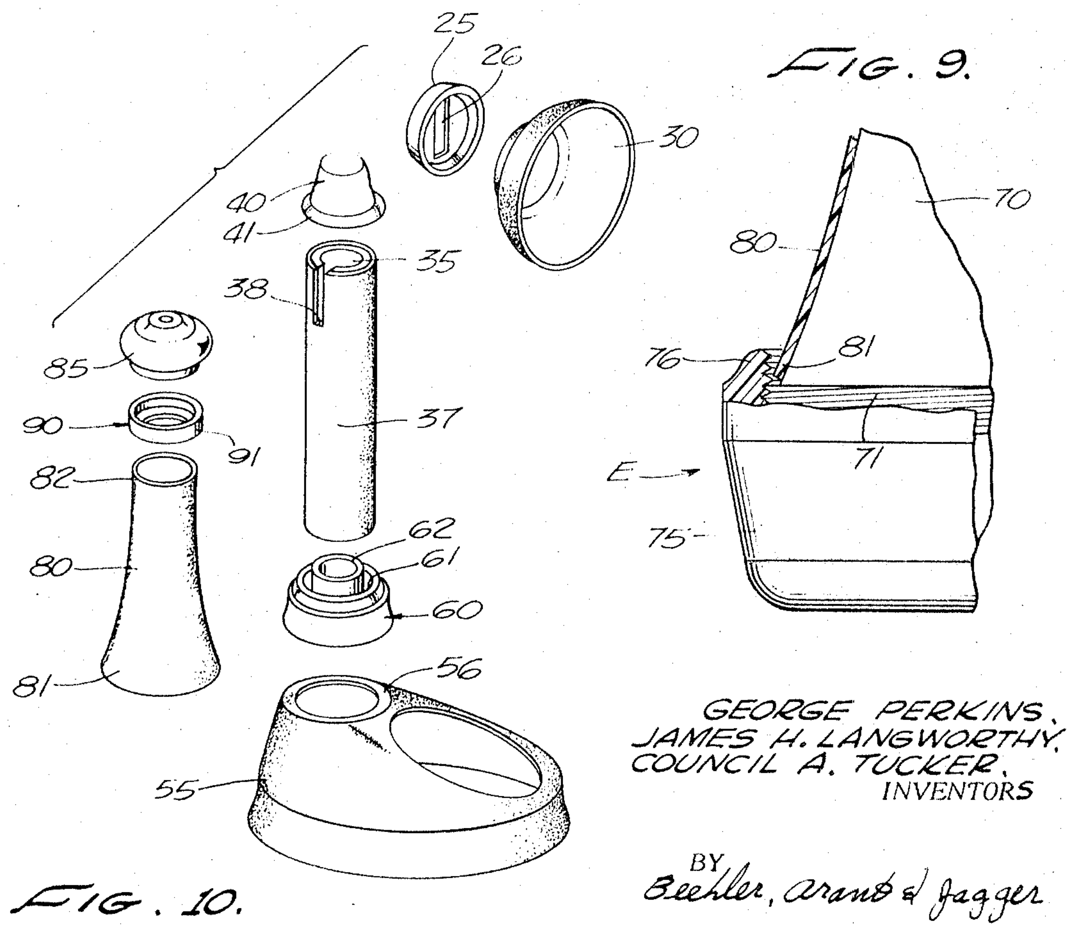
FIG. 9 is a fragmentary cross-sectional view of another portion of the receiver, showing in enlarged form a lower portion of FIG. 6.
FIG. 10 is an exploded perspective view showing most of the housing members contained in the instrument.

The hook D has no unique characteristics insofar as disclosed in the present drawings, however, it will be noted in FIGS. 1 and 10 that its vertical reciprocating movement is permitted by a notch 38 formed in the upper ends of column 35 and cover member 37.

Receiver assembly E (FIGS. 6, 8, and 9) includes a receiver housing 70 which is of a generally cylindrical configuration but flared outward to a larger diameter at one end. The enlarged end of receiver housing 70 is threaded at 71, permitting the threaded attachment of the receiver end cap or ear piece 75. An ornamental cover member 80 is fitted tightly over the external surface of the housing 70 throughout most of its length. The enlarged end 81 of the cover member 80 is covered by the flange 76 of ear piece assembly 75, and is thereby protected from being torn loose or damaged.

It will, of course, be understood that the receiver housing 70 is a relatively rigid structure, being preferably integrally formed from relatively rigid plastic material, while the ornamental cover member 80 has a much thinner wall which may be of more flexible material. The external diameter of receiver housing 70 increases continuously from one end to the other, as does the internal diameter of ornamental cover member 80. As a result of that configuration the ornamental cover member 80 may be molded or vacuum formed as a relatively rigid part, and it can be slipped over the narrow end of the receiver housing 70 and advanced to the relative position as shown in the drawings.

It may here be noted that the base housing 50 is also characterized by an external diameter which is maximum at the bottom, minimum at the top, and which increases progressively from the top to the bottom. Therefore, in view of the corresponding configuration of the ornamental cover member 55, it is possible to form the ornamental cover member 55 as a relatively rigid member, and place it over the top of the base housing 50 and drop it downward over the base housing. Only a very slight deformation of the cover member 55 is required in order to fit it around the circular ridge 52, as well as over the rest of the base housing 50. It will thus be seen that the characteristic of a continuously increasing external diameter, from one end to the other, characterizes not only the receiver housing 70 but also the base housing 50 and the transmitter housing 15, as well as their respectively associated ornamental cover members.

Figure 8:
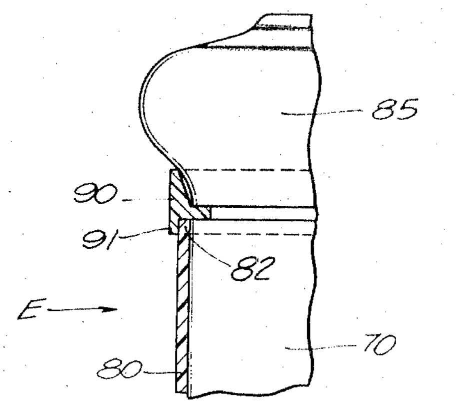
FIG. 8 is a fragmentary cross-sectional view of a portion of the receiver, showing in enlarged form an upper portion of FIG. 6.

In the receiver assembly E a hook fitting 85 is attached to the small or upper end of the receiver housing. A ring-shaped receiver ferrule 90 fits into an annular groove that is provided between the hook fitting 85 and the end of the receiver housing 70. The ferrule 90 has a circumferential flange 91, which depends downwardly as shown in FIGS. 6 and 8, which overlies the upper end 82 of the ornamental cover member 80. The relatively tight fitting relationship between the flange 91 and the end 82 of cover member 80 provides a protection for the cover member, preventing it from being torn loose or damaged.

As will be understood by those skilled in the art, what has been described are preferred embodiments in which modifications and changes may be made without departing from the spirit and scope of the accompanying claims.

What is claimed in support of Letters Patent is:

1. An ornamental telephone enclosure comprising:

a. a base for supporting electrical mechanical components of the telephone including a dial;

b. a base housing on the base for receiving the electrical mechanical components, the housing having a circumferential, horizontal external ridge at its lower end, a sloping surface extending up and from the base, an opening in the sloping surface for the dial, a circular external ridge bounding the dial opening, and an upper apex defining a horizontally disposed opening;

c. a thin ornamental cover fitted tightly over and conforming to the exterior surface of the base housing, abutting firmly against the lower external ridge and the circular external ridge bounding the dial opening, and overlying the apex end of the housing;

d. a base adapter having an axial hole therethrough, a horizontal annular groove at its upper end, an annular horizontal and external notch at its lower end, an annular, external and horizontal shoulder bordering the lower end of the notch and resting on the base housing on the apex end thereof around the horizontally disposed opening therethrough, and an annular, axially extending portion bounding the shoulder and disposed in the opening at the apex end of the housing, the portion of the ornamental cover overlying the apex end of the housing being firmly received in the notch of the base adapter;

e. a cylindrical hollow column for electrical conductors received in the annular groove at the upper end of the base adapter;

f. a thin ornamental cylindrical cover fitted tightly over and conforming to the column and also received in the annular groove at the upper end of the base adapter;

g. a top cap having a circumferential axially extending flange and an annular, horizontal shoulder interiorly of the axially extending flange, the column abutting the shoulder and the flange overlying the column covering and the column;

h. a transmitter assembly for receiving an electromechanical transmitter, the transmitter assembly being pivotally mounted on the top cap and having a transmitter housing of generally bowl-shaped configuration, a mouthpiece secured to the transmitter housing at the latter's large end, a circumferential ridge of the transmitter assembly housing at the large end thereof, an annular groove in the circumferential ridge, and a transmitter ferrule on the small end of the transmitter housing and having a circumferential flange overlying such small end;

i. a thin ornamental transmitter housing cover fitted tightly over and conforming to the exterior surface of the transmitter housing, one end of such cover being received in the annular groove in the circumferential ridge of the transmitter housing and the other end of such cover being received between the transmitter housing and the flange of the transmitter ferrule;

j. a receiver assembly for receiving an electromechanical receiver, the receiver assembly being coupled to the base and having a cylindrical receiver housing with a first end flared outwardly, an ear piece secured to the first end of the receiver housing and defining a flange overlying the first end, a hook fitting closing the second end of the receiver housing, a receiver ferrule secured to the receiver housing at the second end thereof and defining a circumferential flange overlying the receiver housing; and k. a thin ornamental receiver cover fitted tightly over and conforming to the exterior surface of the receiver housing with its first end being received beneath the ear piece flange and its second end being received beneath the receiver ferrule flange.

2. The ornamental telephone enclosure claimed in claim 1 wherein the ear piece of the receiver assembly has female threads, the first end of the receiver housing has complementary male threads and the ear piece is secured to the receiver housing at the threads, the flange defined by the ear piece being at the entrance to the threads thereof.

3. The ornamental telephone enclosure claimed in claim 1 wherein the transmitter assembly includes a swivel shank extending from the small end of the transmitter housing, the transmitter assembly being pivotally secured to the top cap through such swivel shank, and the transmitter ferrule has a slot therethrough receiving the swivel shank.

* * * * *